March 31, 1964     E. E. JENNINGS     3,126,560
THREAD CHASER AND CHIP BREAKER AND DEFLECTOR COMBINATION
Filed Feb. 8, 1961     3 Sheets-Sheet 1

INVENTOR.
EDWARD E. JENNINGS
BY
ATTORNEY.

INVENTOR.
EDWARD E. JENNINGS.
BY
ATTORNEY

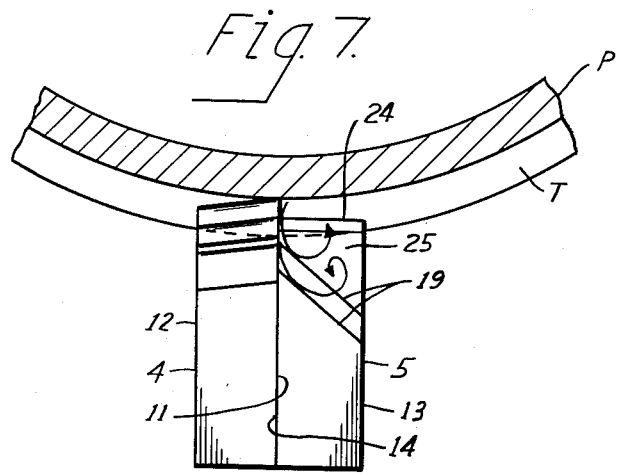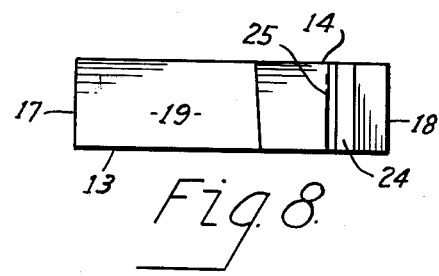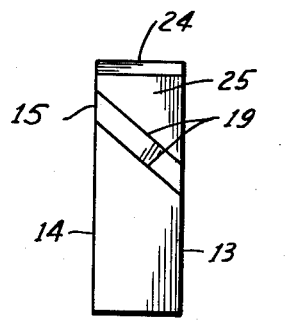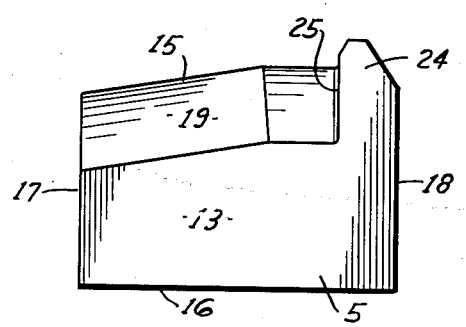

United States Patent Office 3,126,560
Patented Mar. 31, 1964

3,126,560
THREAD CHASER AND CHIP BREAKER AND DEFLECTOR COMBINATION
Edward E. Jennings, Cleveland, Ohio, assignor to The Pipe Machinery Company, Wickliffe, Ohio, a corporation of Ohio
Filed Feb. 8, 1961, Ser. No. 87,926
4 Claims. (Cl. 10—111)

This invention relates to a chip breaker and to a thread chaser and chip breaker combination, and particularly to a high speed carbide chaser and chip breaker combination.

The present chaser and breaker are particularly adapted for mounting in a die head used for cutting tapered threads on a machine such as disclosed in the United States Patent No. 2,679,057 of Neil T. Sawdey, issued May 25, 1954, and in the copending application of William L. Benninghoff, Serial No. 796,554, filed March 2, 1959, now abandoned.

As pointed out in the above entitled application, so-called high speed chasers composed of steel alloys known in the trade as high speed tool steel are being replaced for some purposes by so-called "higher speed" chasers. The latter are made of carbides which have much greater heat resistance and greater rigidity and hardness under high temperatures than do high speed steel chasers. The so-called higher speed chasers are commonly made of sintered carbide, sintered tungsten carbide being a typical example.

Due to the high speed at which the chasers operate, the chips formed thereby are exceedingly hot and, if they are allowed to take their normal path onto the threaded portion of the pipe at the trailing end of the chaser having the finishing tooth, they immediately burn themselves into the metal of the pipe and weld securely thereto. Again, if not properly deflected, they produce a severe scuffing and scratching of the very finely finished surfaces of the threads on the pipe.

Heretofore, with such carbide chasers, it has been customary to provide chip breakers. Usually these chip breakers comprise a sintered carbide body and are disposed at the forward face of their associated chasers, that is, at the face of the chasers facing toward the oncoming metal to be cut. Each chaser is disposed with one of its edges close to the root line of the chaser teeth, but spaced therefrom in a direction away from the teeth.

Generally, a portion of the forward face of each breaker is bevelled from at or near its said one edge in a direction away therefrom and from the teeth and forwardly of the chaser.

Chips engaging this bevelled surface are deflected forwardly and caused to curl and break so that they can be removed readily. However, the chips which are formed by the last tooth of the last chaser in the set, which tooth produces the finished form, tend to curl and bend back in the trailing direction and pass around the trailing tooth and onto the threaded portion of the pipe just beyond the trailing tooth. For this reason, the prior chip breakers, whether separate from the chaser or integral therewith, have not proven satisfactory in directing chips away from the threaded portion of the pipe in many instances.

In accordance with the present invention, the conventional type of carbide chaser is combined with a breaker having such a bevelled face, but the face extends from the leading end of the breaker only part way to it trailing end. Beyond the trailing end of the bevelled face, in the trailing direction, is a shoulder which extends forwardly at an abrupt angle from the forward face of the breaker and chaser and faces toward the leading end of the chaser so that the chips engaging the bevelled face and tending to pass back toward the trailing end of the chaser and onto the finished threads, strike the shoulder and are deflected forwardly of the forward face and also toward the leading end of the breaker, so that they are broken off and prevented from passing onto the finished threads of the pipe.

The various advantages of the present invention will become apparent from the following description wherein reference is made to the drawings, in which.

Figure 4:
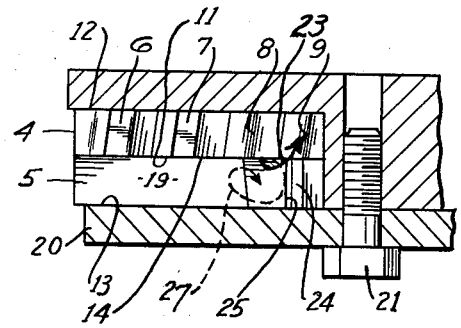
FIG. 4 is a top plan view of the chaser and breaker showing the same clamped in operating position relative to each other.
Figure 5:
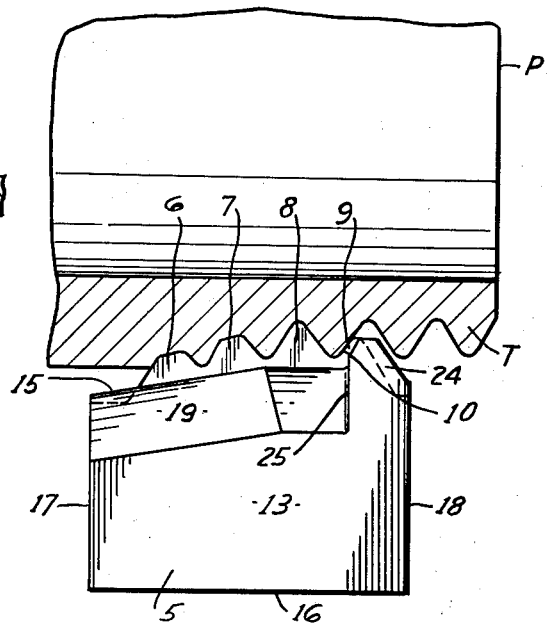
Figure 6:
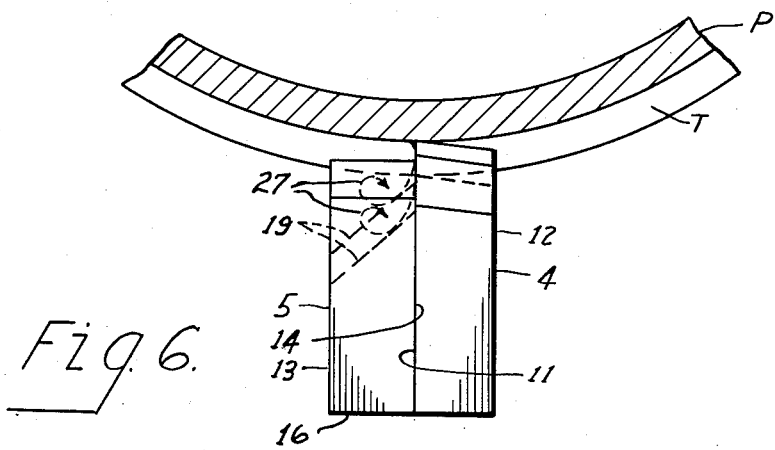

FIGS. 5, 6, and 7 are a side elevation, a right end elevation, and a left end elevation, respectively, of the chaser and breaker illustrated in FIG. 4, the clamping means being omitted for clearness in illustration; and FIGS. 8, 9, and 10 are, respectively, a top plan view, a side elevation, and a left end elevation, of the chip breaker.

Figure 1:
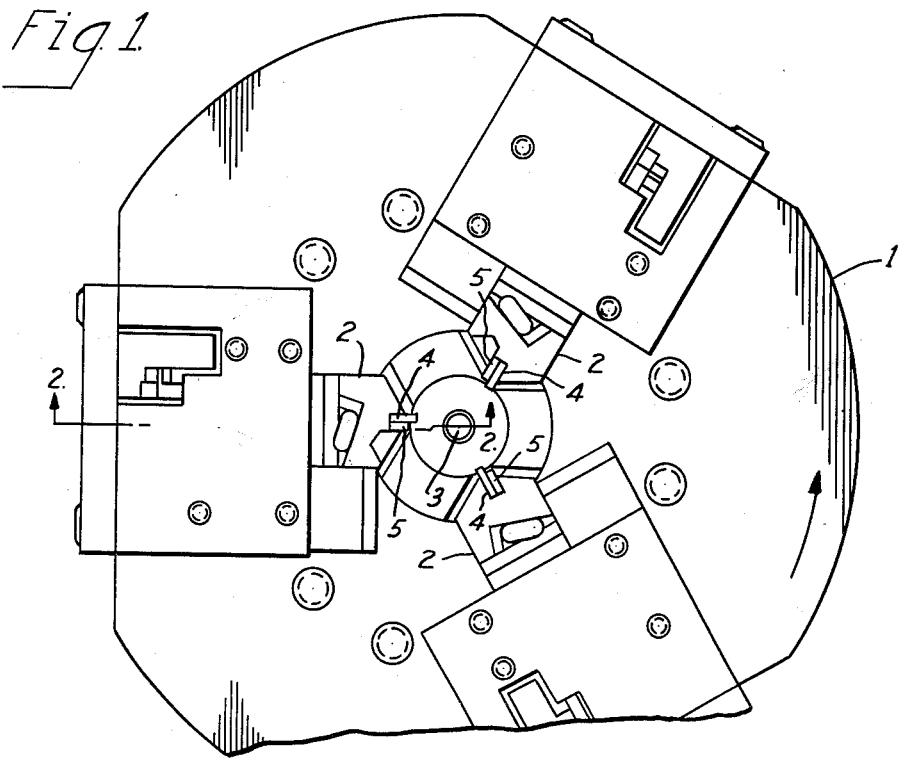
FIG. 1 is a fragmentary front elevation of part of a die head with a chaser and chip breaker of the present invention installed therein.
Figure 2:
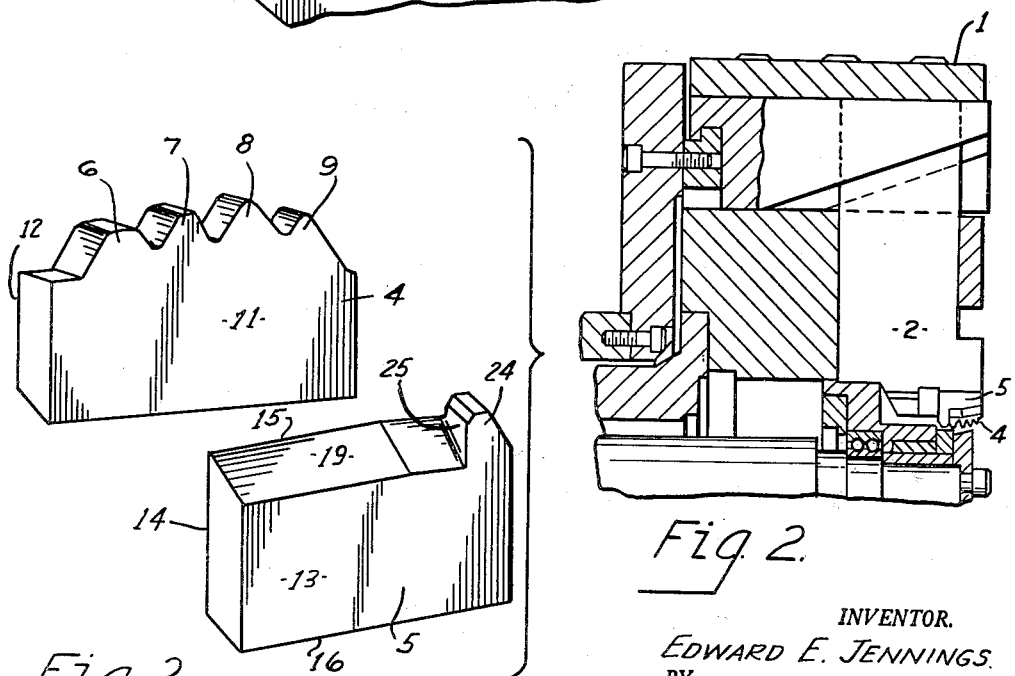
FIG. 2 is a fragmentary sectional view of the die head, taken on the line 2—2 in FIG. 1.
Figure 3:
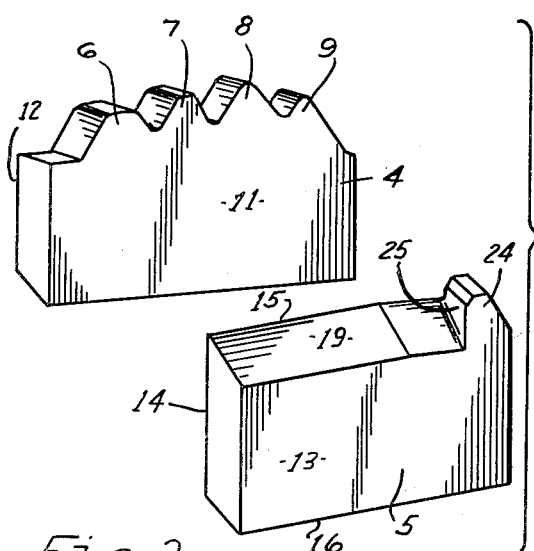
FIG. 3 is an exploded perspective view of a chaser and breaker showing the manner in which they are to be positioned for operation.

Referring to the drawings, FIG. 1 illustrates a die head 1 which may be of the general character illustrated in the above identified patent and copending application. The die head 1 is provided with a plurality of chaser blocks 2 which are mounted in the head for reciprocation radially toward and away from the rotational axis 3 of the head. Mounted on the block 2 of the last chaser of the set is a carbide chaser 4, having the finishing tooth, and a chip breaker 5.

In the die head illustrated, three chasers are used, and breakers are provided, one for each chaser. Since the chasers are essentially the same, as also are their relation to their associated chip breaker, only the third and final chaser and its associated chip breaker are described in detail, this being the chaser which makes the final finish cut.

As described in the identified application, it is necessary for carbide or higher speed chasers to operate at all times so that they are making a positive cut of the metal, and consequently chips generally are being cut along the entire length of the cutting edge of the chasers as defined by the row of teeth.

Referring next to FIGS. 4 through 7, the third chaser and its associated chip breaker are illustrated and shown in their cooperative relation to each other. The chaser is one having teeth 6, 7, 8, and 9 arranged in a row with the tooth 6 as the leading tooth in the direction of advance of the chaser axially of the thread being cut. The teeth define a cutting edge, extending from the cutting edge of the leading tooth 6 rearwardly to and including the cutting edge of the trailing tooth 9. The tooth 9 preferably is a truncated or shortened tooth so that it does not enter fully into the root of the thread being cut, but merely cuts along a portion of its edge nearest the leading end of the chaser, as indicated at 10. The tooth 6 at the leading end of the chaser is truncated as also is the tooth 7, the tooth 8 being the full tooth. The advantages of this particular chaser are described in the above identified application.

The chaser is preferably in the form of a flat metal body having a forward face 11 which faces the oncoming metal being threaded, and a rearward or back face 12. Preferably these faces are coplanar. The cutting edge, at the intersection of the teeth with the forward face, is continuous from the leading cutting portion of the tooth 6 to the portion 10 of the tooth 9.

The chip breaker 5 comprises a body preferably having a forward face 13 and a rear face 14, the forward face 13 facing forwardly, peripherally of the article being threaded, toward the oncoming metal during thread cutting, and the face 14 being juxtaposed in face to face contact with the forward wall 11 of the chaser 4. The breaker has an upper edge 15, a lower edge 16, a leading edge 17, and a trailing edge 18. The leading edge 17 is substantially at the leading edge of the chaser 4 and the trailing edge 18 is disposed substantially at the trailing edge of the chaser.

The edge 15 of the breaker is disposed near to the line of the roots of the teeth 6, 7 and 8, but is spaced therefrom in a direction away from the teeth toward the opposite or lower edge 16 of the breaker. The forward face 13 of the chaser, beginning at a line spaced toward said opposite edge from the root line of the teeth, is bevelled from the forward face 13 back toward the rear face 14 and up toward the edge 15, as indicated at 19. Preferably, this bevel extends all the way from the front face to the plane of the juxtaposed rear face 14 of the breaker and forward face 11 of the chaser.

The chaser and combined breaker and deflector are secured firmly together in fixed position by clamps 20 and suitable bolts 21, or other means. Thus, as the chips are formed by the cutting edge, they tend to move downwardly and slightly rearwardly and, upon striking the bevelled surface 19, are deflected forwardly toward the oncoming metal being cut so that they curl forwardly and tend to break and fall away from the forward face of the breaker.

However, as the trailing end of the row of teeth is approached, the chips formed by the tooth 8 and the forward portion 10 of the truncated tooth 9 tend to curl back around or over the tooth 9 and into engagement with finished threads T of the pipe P, a portion of which is shown in FIG. 5. This particular action is not prevented by existing chip breakers. They fail to function properly as to this action when the chasers are operated at high speed.

Chips thus formed ordinarily follow a path which roughly may be indicated by the solid arrow 23 in FIG. 4. To prevent this action, a portion of the breaker near the trailing end, is provided with a shoulder 24 which has a deflecting face 25 which extends in the direction forwardly of the forward face of the breaker at a very abrupt angle, preferably at an angle of 90°, and which faces toward the leading end of the breaker. Preferably, also, the deflecting face 25 extends parallel to a radial plane normal to the axis of relative rotation of the pipe or object being threaded and the chasers. This shoulder and face are obtained by continuing the bevelled face 19 only part way toward the trailing end of the chaser. If desired, a portion of the bevelled face 19, beginning a short distance forwardly of the forward face 25 may be bevelled at a slightly different angle to the remainder thereof. This is to conform to a corresponding change in slope of the root line adjacent the trailing tooth so as to leave as much space as possible for chips.

The breaker is secured in position relative to the chaser with the upper edge 15 of the breaker closely adjacent the root of the teeth. Longitudinally, the breaker is positioned so that the face 25 is just rearwardly, in the trailing direction, of the trailing end of the cutting edge defined by the teeth, which is the portion 10 in the form shown.

Therefore, any chips cut by the trailing end portion of the cutting edge strike the face 25 and are deflected forwardly of the forward face in the direction of the oncoming stock and also back toward the leading end of the chaser, as indicated by the dotted arrow 27 in FIGS. 4 and 6. The deflection by the face 25, combined with that of the surface 19, very effectively directs the chips so that they do not come into contact with the threads of the pipe.

As mentioned, it is desirable that the face 25 extend at an abrupt angle to the forward face of the chaser and also that it face the leading end of the chaser. Preferably, it defines a plane which is at right angles to the plane of the cutting edge of the chaser and to the length of the chaser.

With the arrangement described, it has been found that the chips are broken and deflected effectively at high speed and they do not pass back into contact with the finished thread cut by the associated chaser. Instead, all are broken off readily and directed to a position in which they can be washed away promptly and removed from the cutting throat.

Having thus described my invention, I claim:

1. In a thread chaser and chip breaker combination, a breaker comprising a metal body having forward and rear faces with a leading end and a trailing end, and top and bottom edges, a forward face portion of the body being bevelled back toward the rear face, beginning at a location spaced from the top edge, to the top edge for a distance from the leading end part way toward the trailing end, said body having a deflecting wall portion at the relatively trailing end of the bevelled face portion extending at an abrupt angle forwardly from the bevelled face portion and facing toward said leading end of the body, a thread chaser having a forward face, said body being clamped in an operating position, relative to the thread chaser, wherein the rear face of the body is juxtaposed against, and substantially parallel to, said forward face of the chaser, the top edge of the body is spaced from the cutting edge of the chaser in a direction edgewise of the chaser toward the opposite edge of the chaser, the leading end of the body is adjacent the leading end of the chaser, and the deflecting wall portion of the body is positioned near to, but beyond, in the trailing direction, the last complete forming tooth of the chaser, and said angle of said deflecting wall portion being sufficiently abrupt so as to be able to deflect chips striking the deflecting wall portion forwardly and then back toward the leading end of the breaker and away from the trailing ends of the breaker and chaser.

2. In an external thread chaser and chip breaker combination, a chaser comprising a carbide body having a forward side face which is adapted to lead in the direction of cutting, cutting teeth arranged in a row extending lengthwise of the body along one edge thereof from near the leading end of the body toward the trailing end, each tooth extending generally transversely of the body from the forward side face, and said teeth defining a cutting edge at the forward side face, a chip breaker having a forward face, having a rear face juxtaposed against said forward side face of the chaser, and having one edge disposed near to, but spaced in a direction toward the opposite edge of the chaser from the root line of the chaser teeth, said breaker extending from adjacent the leading end of the cutting edge of the chaser to the trailing end of the said cutting edge, the surface of said one edge of the breaker being beveled to provide a deflecting face which slopes from the forward face of the breaker back toward the rear face of the breaker and toward the root line of the teeth from a location which is spaced from said root line in a direction transversely of the forward face of the breaker toward said opposite edge, said deflecting face extending from adjacent the leading end of the cutting edge of the chaser lengthwise of the row of teeth, a chip deflecting shoulder on the breaker and having a substantially planar face intersecting said deflecting face and extending forwardly from the forward face of the chaser to the forward face of the breaker at substantially 90° to the row of teeth, and facing generally endwise of the deflecting face toward the leading end thereof, means securing said chip breaker fixedly in position in said face to face juxtaposed position with the deflecting face of the shoulder positioned near to, but beyond, in the trailing direction, the last complete forming tooth of the chaser.

3. A structure according to claim 2 wherein the deflecting face extends entirely to the rear face of the breaker.

4. A structure according to claim 2 wherein the chip deflecting shoulder is positioned to protrude into the space between those two adjacent threads next beyond the final forming tooth in spaced relation to the adjacent side walls of said two adjacent threads.

References Cited in the file of this patent
UNITED STATES PATENTS

| | | |
|---|---|---|
| 1,399,932 | Conant | Dec. 13, 1921 |
| 1,843,950 | Gates | Feb. 9, 1932 |
| 1,854,672 | Robinson et al. | Apr. 19, 1932 |